United States Patent [19]
Pfarr et al.

[11] Patent Number: 5,746,566
[45] Date of Patent: May 5, 1998

[54] APPARATUS FOR A MOVING WORKPIECE

[75] Inventors: Craig E. Pfarr, Issaquah; Norman A. Rudy, Renton, both of Wash.

[73] Assignee: Design Systems, Inc., Redmond, Wash.

[21] Appl. No.: 429,055

[22] Filed: Apr. 26, 1995

[51] Int. Cl.$^6$ .................................................. G25J 9/06
[52] U.S. Cl. .................. 414/751; 414/744.5; 414/917; 901/15; 74/490.1
[58] Field of Search .................................. 414/751–753, 414/749, 744.5, 917; 901/8, 15; 74/490.03, 490.08, 490.09, 490.1; 33/23.01; 198/434, 456

[56] References Cited

U.S. PATENT DOCUMENTS

| | | | |
|---|---|---|---|
| 4,048,885 | 9/1977 | Miyakita et al. | 83/38 |
| 4,335,636 | 6/1982 | Porter | 83/177 |
| 4,573,382 | 3/1986 | Kloehn et al. | |
| 4,618,309 | 10/1986 | Gregg et al. | |
| 4,712,971 | 12/1987 | Fyler | 414/744.5 |
| 4,903,559 | 2/1990 | Landeck | |
| 5,180,276 | 1/1993 | Hendrickson | 901/15 X |
| 5,243,886 | 9/1993 | Rudy et al. | 83/19 |
| 5,339,715 | 8/1994 | Coleman | 83/53 |
| 5,522,275 | 6/1996 | Mauletti | 74/490.03 |

FOREIGN PATENT DOCUMENTS

| | | |
|---|---|---|
| 0 307 174 A1 | 3/1989 | European Pat. Off. |
| 0 317 545 A3 | 5/1989 | European Pat. Off. |
| 2 559 411 | 8/1985 | France |
| 1 529 165 | 10/1978 | United Kingdom |

*Primary Examiner*—Donald W. Underwood
*Attorney, Agent, or Firm*—Christensen O'Connor Johnson & Kindness PLLC

[57] ABSTRACT

An apparatus for cutting workpieces (36) moving along a path relative to the apparatus, including a guide arm (20), a tool mount (24), and two rotation mechanisms (28), (30), is provided. The guide arm (20) includes mounted links (40), (46), and at least two intermediate links (42), (44), pivotably connected end-to-end to each other to define a multiple bar linkage arrangement. The tool mount (24) is attached to the guide arm (20) at a connection of two of the intermediate links. The rotation mechanisms (28), (30) are in communication with the links (40), (46), for pivoting the links (40), (46) to cause movement of the intermediate links (42), (44), further causing the desired movement of the tool mount (24) in the path of the moving workpiece (36). Additional components include a second guide arm (22) positioned on the opposite side of the workpiece (36). The tool mount (24) is elongated to hold multiple nozzles (58) and is pivotably connected between the two guide arms (20), (22). In a second embodiment, the apparatus includes a carriage (82), a pivot frame (80) with a longitudinal guideway (88) capable of engaging the carriage (82), a translation mechanism for moving the carriage (82) along the guideway (88), a tool mount (24) attached to the carriage (82), and a rotation mechanism for pivoting the pivot frame (80). The combined rotation of the pivot frame (80) and translation of the carriage (82) causes desired movement of the tool mount (24) in the path of the moving workpiece (36). Additional components include a second pivot frame (100) positioned on the opposite side of the workpiece (36). The tool mount (24) is elongated to hold multiple nozzles (58) or other tools, and is pivotably connected between the carriages (82) of the first and second pivot frames (80), (100). The apparatus of either embodiment has 2 degrees of freedom, permitting a variety of available cutting patterns.

14 Claims, 6 Drawing Sheets

APPARATUS FOR A MOVING WORKPIECE

FIELD OF THE INVENTION

This present invention relates to apparatus for supporting and moving an operating tool relative to a moving workpiece, and more particularly, to an apparatus for supporting and moving a cutting nozzle to cut a moving workpiece in a variety of two dimensional patterns.

BACKGROUND OF THE INVENTION

A number of technologies require the use of an apparatus to support and move an operating tool relative to a moving workpiece. The workpiece may be translated on a conveyance device, such as a conveyor belt, with the operating tool positioned above the conveyor. The operating tool may be in the form of a cutting device (e.g., water jets, blades, lasers, etc.) that operates to cut the workpiece as the device and workpiece move past each other. The operating tool may also be a spot welder, a spray nozzle, a glue applicator, a drill head, an ingredient adder, or other tool depending on the line of work.

In most production environments, it is important to work as quickly as possible to optimize production efficiency and increase product output. Therefore, the workpiece is usually moving at a fast rate beneath the operating tool of the apparatus. If the workpiece needs to have work performed on it that includes a crosswise component (i.e., a cut extending across a workpiece at a right angle relative to the translation of the conveyor), then the operating tool must move with the workpiece as it is carried by the conveyor in order to compensate for the workpiece's velocity along the conveyor, while at the same time translating across the workpiece.

A known apparatus for making crosswise cuts of moving workpieces on a translating conveyor is available and generally consists of one or more water jet nozzles attached to a tool mount that is moved across a conveyor using a linear actuator. One form of the tool mount includes a long slender guide beam, located above the conveyor, crosswise along a diagonal calculated to compensate for the conveyor's velocity. The tool mount is translated along the guide beam by the linear actuator and has two basic strokes: a first operating stroke moving both across the conveyor and in the direction of the moving workpiece (downstream) and a second return stroke moving both across the conveyor and opposite the direction of the moving workpiece (upstream). When the tool mount is moving with the workpiece, pressurized water, emitted by the water jet nozzles, cuts the moving workpiece crosswise. When the tool mount is moving opposite the workpiece, the water jet nozzles are blocked until the linear actuator returns the tool mount to its start position. The water jet nozzles are then unblocked, and another cut stroke is made. The cycle is repeated.

This device has the obvious disadvantage of cutting in only one direction, i.e., when translating in the crosswise direction that includes a component of motion in the same direction as the moving workpiece. During the time the cutting nozzle is repositioning itself, no cutting is occurring, lowering the production line's operating efficiency. A further disadvantage, at least in the water jet environment, is that the linear bearings in the apparatus do not easily withstand cleaning wash downs with high-pressure water.

Thus, a need exists for an apparatus that may be used to support an operating tool to do work on a moving workpiece, from either crosswise direction relative to the workpiece's direction of motion. The ideal apparatus should also be capable of accomplishing a variety of operating patterns to further increase its usefulness. In particular, a need exists for a cutting apparatus that may be used to cut rapidly moving workpieces in complex shapes, when translating from either crosswise direction over the workpiece. For water jet cutting nozzles, linear bearings should be avoided in favor of rotary joints that may use watertight shaft seals. The present invention is directed to fulfilling this need.

SUMMARY OF THE INVENTION

In accordance with the present invention, an apparatus for doing repetitive work to moving workpieces, where the repetitive work involves complex two dimensional patterns, is provided.

In accordance with further aspects of the present invention, a cutting apparatus for rapidly cutting moving workpieces from either crosswise direction, is provided. The first preferred embodiment of a cutting apparatus includes a guide arm, a tool mount and two rotation mechanisms. The guide arm includes mounted links and at least two intermediate links, pivotably connected end-to-end to each other, to define a multiple bar linkage arrangement. The tool mount is attached to the guide arm at a location on the intermediate links. The two rotation mechanisms pivot the mounted links to cause movement of the intermediate links, further causing movement of the tool mount in the path of the moving workpiece. The apparatus has two degrees of freedom, permitting a large variety of possible cutting patterns.

In accordance with yet further aspects of the present invention, a second guide arm is provided and is synchronized with the movement of the first guide arm. The synchronization is preferably accomplished using one or more coupler links each having a first end attached to the first guide arm and a second end attached to the second guide arm. A second preferred method for synchronizing the first and second guide arms includes third and fourth rotation mechanisms in communication with the second guide arm for pivoting the mounted links of the second guide arm to cause movement of the intermediate links of the second guide arm and further cause a movement of the tool mount in the path of the workpiece.

In accordance with still other aspects of the present invention, a second embodiment is provided having a carriage, a pivot frame with a longitudinal guideway capable of engaging the carriage, a translation mechanism for moving the carriage along the guideway, a tool mount attached to the carriage, and a rotation mechanism for pivoting the pivot frame. The combined rotation of the pivot frame and translation of the carriage causes movement of the tool mount in the path of the workpiece. The apparatus also has two degrees of freedom, permitting a variety of available cutting patterns.

In accordance with yet further aspects of the present invention, a second pivot frame and method for synchronizing the movement of the first and second pivot frames, is provided. A first preferred synchronization method includes a coupler link having a first end rotatably attached to the first pivot frame and a second end rotatably attached to the second pivot frame. A second preferred synchronization means includes a second rotation mechanism in communication with the second pivot frame for rotating the second pivot frame about its axis of rotation. Rotation of the second pivot frame causes relative rotary motion of the carriage of the second pivot frame, further causing rotation of the tool mount along the path of the moving workpiece.

In accordance with yet still other aspects of the present invention, the tool mount may support one or more cutting nozzles, grasping fingers or other tools to operate on workpieces.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
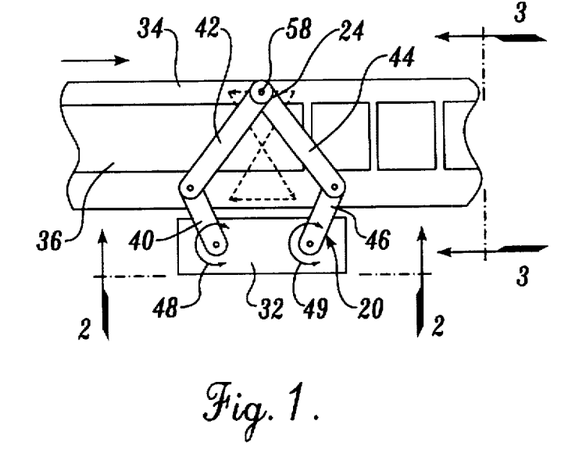
FIG. 1 is a plan view schematic of a single guide arm cutting apparatus constructed in accordance with the present invention.
Figure 2:
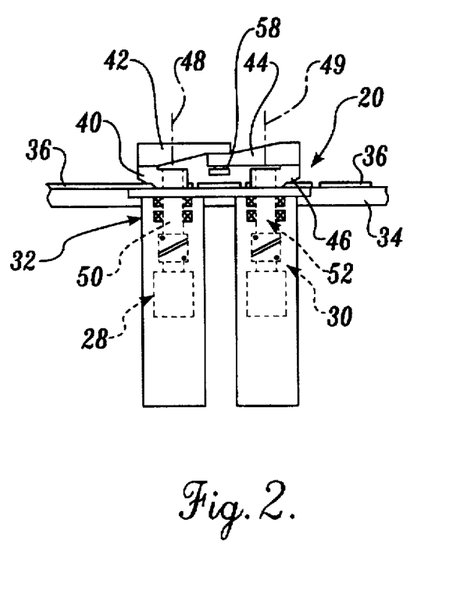
FIG. 2 is a rear view schematic of the single guide arm cutting apparatus of FIG. 1.
Figure 3A:
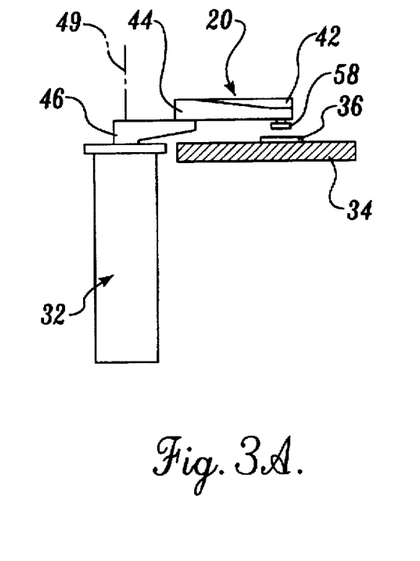
FIG. 3A is a side view schematic of the single guide arm cutting apparatus of FIG. 1.

FIGS. 1, 2, and 3A show schematic views of a single guide arm cutting apparatus constructed in accordance with the present invention. The apparatus includes a guide arm 20, a tool mount 24, and two rotation mechanisms 28, 30 (shown in FIG. 2). The apparatus is generally mounted to a stable frame 32 that is positioned beside a conveyor 34 carrying the moving workpiece 36. The attachments of the apparatus to the frame 32 are a fixed distance apart and do not translate relative to each other.

The guide arm 20 has mounted links 40 and 46, and at least two intermediate links pivotably connected end-to-end to each other, to define a multiple bar linkage arrangement. The preferred embodiment includes two intermediate links 42, 44, thereby defining a five-bar linkage arrangement. To reduce wear on the components of the apparatus and to increase the apparatus' speed, it is advantageous to use links that are hollowed out, or otherwise reduced in weight.

The links 40, 46 are rotatably attached to the frame 32. These rotatable attachments are preferably made using very rigid ball bearings or bushings (not shown), to add further stability to the guide arm 20. The attachment of the links 40, 46 to the frame 32 allows the links 40, 46 to rotate about an axes of rotation 48, 49 generally perpendicular to the links 40, 42, 44, 46. The preferred attachment includes two shafts 50, 52, connected to the links 40, 46. Each shaft 50, 52 includes components know to those skilled in the art, for protecting the shafts 50, 52 during high-pressure water cleanings, e.g. seals, etc. Other attachment methods may be used, so long as the links 40, 46 are free to rotate in arcs sufficient for the intended application.

Figure 4:
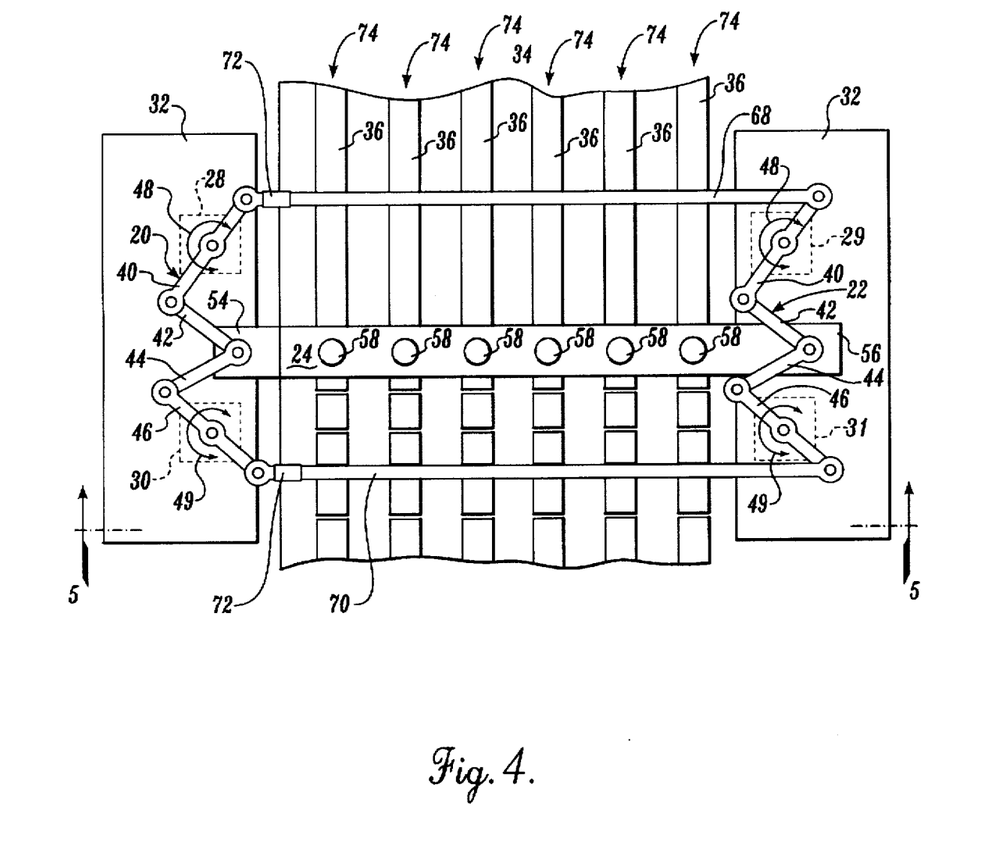
FIG. 4 is a plan view schematic of a double guide arm cutting apparatus constructed in accordance with the present invention.

FIGS. 1, 2, and 3A show the preferred five-bar multiple bar linkage arrangement generally forming an inverted "U" shape. This is only meant to be illustrative of one arrangement of the present invention that works well with a workpiece 36 moving past one side of the guide arm 20. Another possible multiple link arrangement is shown in FIG. 4, where guide arms 20, 22 generally form an "M" shape. The multiple bar linkage arrangement may easily be configured to accommodate a conveyor 34 passing between the links 40, 46.

The tool mount 24 is attached to the guide arm 20, preferably at a connection of two of the intermediate links 42, 44. The tool mount 24 may be adapted to hold one or more jet nozzles 58, or other operating tools (blades, router, lasers, spot welders, spray nozzles, glue applicators, drill heads, ingredient adders, pickup devices, etc.). The tool mount 24 is preferably a high-pressure water manifold with one or more cutting nozzles 58 mounted to it. The tool mount 24 of FIGS. 1, 2 and 3A are relatively small, since only one nozzle 58 is mounted thereon. The tool mount 24 may be elongated as in FIG. 6 to hold the nozzle 58 further from the guide arm 20, or as in FIGS. 4, 5, 7, and 8 to hold multiple nozzles 58. For either case, the attachment of the tool mount 24 to the guide arm 20 may be mechanically stabilized or restrained in orientation using methods known to those skilled in the art.

The two rotation mechanisms 28, 30 are in communication with corresponding links 40, 46 and cause the links 40, 46 to pivot about their rotatable attachments to the frame 32. The preferred rotation mechanisms 28, 30 are motors that drive the preferred shafts 50, 52. Any positioning technology, however, may be used, e.g., stepper motors, pneumatic actuators, hydraulic actuators, etc. The preferred rotation mechanisms 28, 30 should be capable of being programmed to rotate in a certain manner so that they may easily be modified for use in the next application requiring a different nozzle pattern.

In operation, the rotation mechanisms 28, 30 cause rotation of the links 40, 46 which causes movement of the intermediate links 42, 44 and, therefore, desired movement of the tool mount 24 in the path of the moving workpiece 36. Because the apparatus provides two degrees of freedom for moving the tool mount 24, the apparatus is capable of performing a variety of cutting patterns and geometries without having to stop the cutting nozzle 58 in order to reposition the guide arm 20.

For performing the crosswise cuts discussed in the Background, the nozzle 58 is translated diagonally across the moving workpiece 36 in the direction of its motion. Once this cut stroke is completed and the nozzle 58 is no longer positioned above the workpiece 36, the nozzle 58 is translated upstream along a path parallel and opposite the direction of the moving workpiece 36. The nozzle 58 is then translated diagonally across the moving workpiece 36, back to the original side, again, with a component of motion parallel to the direction of the moving workpiece 36. Once the nozzle 58 is no longer positioned above the workpiece 36, it is translated upstream to its original position. In this manner, the tool mount 24 causes the nozzle 58 to define a bow-tie cutting pattern, as shown in FIG. 1.

Figure 3B:
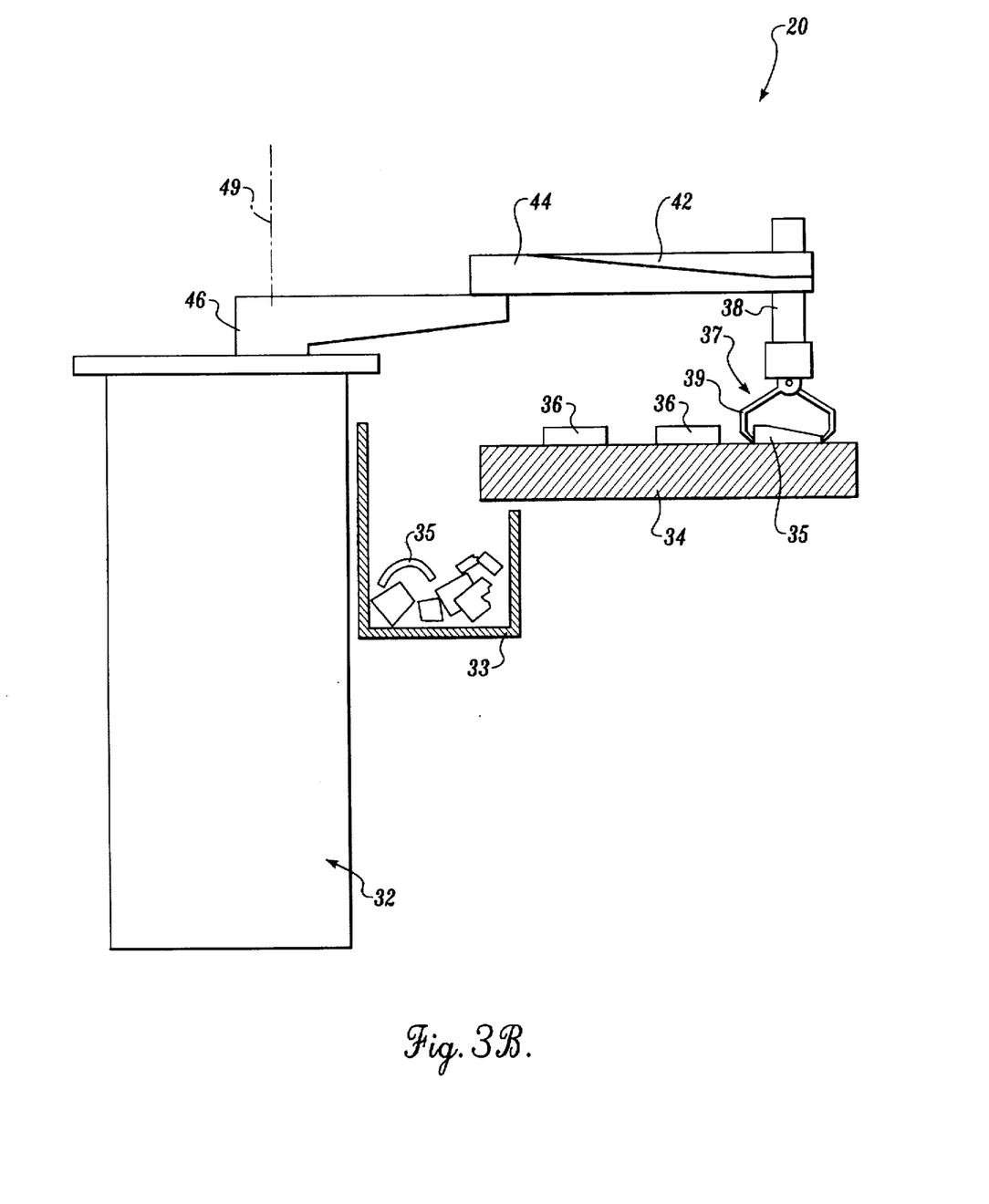
FIG. 3B is a side view schematic of a single guide arm pickup apparatus constructed in accordance with the present invention.

FIG. 3B shows a schematic side view of a single guide arm pickup apparatus constructed in accordance with the present invention and is included as one example of the present invention as configured for doing work other than cutting. The pickup apparatus is similar to the cutting apparatus shown in FIGS. 1, 2 and 3 and described above, with the exception that the tool mount 24, supports a pickup mechanism 37 instead of a water jet cutting nozzle 58. In operation, the pickup mechanism 37 may be used, for example, to remove a defective workpiece 35 to a rejection bin 33, as shown in FIG. 3B.

The pickup mechanism is illustrated as including a linear actuator 38 for raising and lowering as well as opening and closing fingers 39 used to grasp the workpiece 35. Pickup mechanisms, such as mechanism 37, are commercially available. It is to be appreciated that fingers 39 could be replaced with other systems for picking up the workpiece, for instance a suction cup or an electromagnet (for a metallic workpiece). It also is to be appreciated that a pickup mechanism, such as mechanism 37, can be used in conjunction with pivot frame 80 described below.

Figure 5:
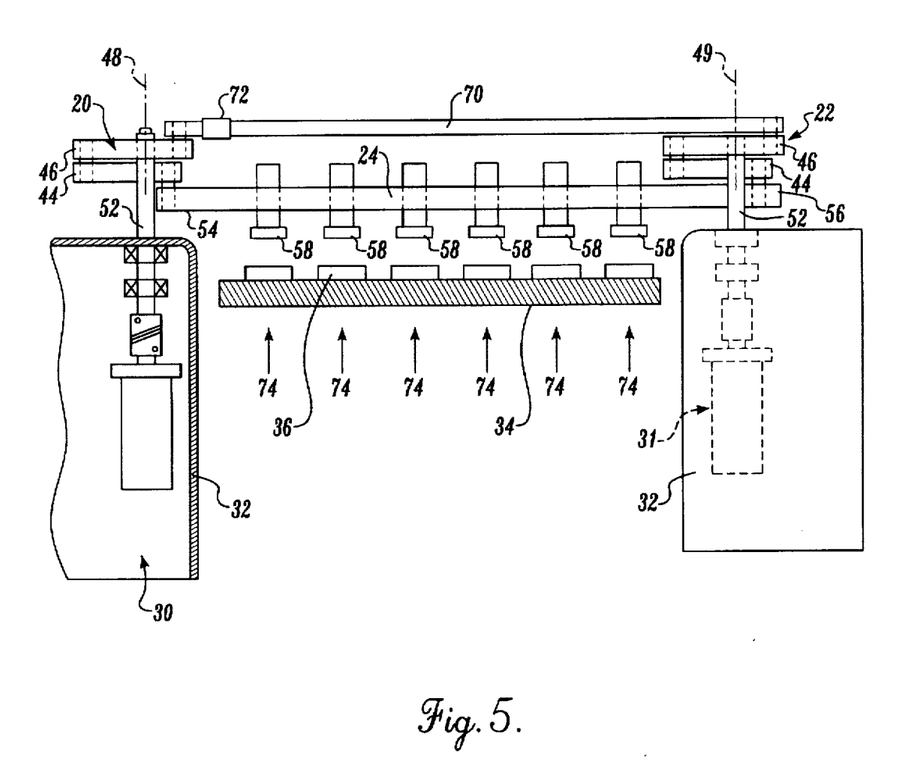
FIG. 5 is a side view schematic of the double guide arm cutting apparatus of FIG. 4.

A second guide arm 22 may be added to work in conjunction with a first guide arm 20, as shown in the schematic views of a double guide arm cutting apparatus constructed in accordance with the present invention presented in FIGS. 4 and 5. The second guide arm 22 is positioned opposite the first guide arm 20, on the other side of the moving workpiece 36. The second guide arm 22 may be precisely the same as the first guide arm 20 (as shown in FIG. 4), a mirror image of the first guide arm 20, or an entirely different multiple link arrangement than the first guide arm 20. The arrangement will depend on the application to which the apparatus is being used and the cutting pattern desired. The addition of a second guide arm 22 adds farther stability to the apparatus by allowing it to be supported by a total of four attach points (i.e., two attach points from each guide arm 20, 22).

An elongated tool mount 24 with first and second ends 54, 56 rotatably connected between the guide arms 20, 22, is shown in FIG. 4. The elongated tool mount 24 is preferably a high-pressure water manifold with one or more cutting nozzles 58 mounted to it. Likewise, a single water jet nozzle 58 may be supported by the tool mount 24 if only one line 74 of moving workpieces 36 is passing by the apparatus. The first end 54 of the tool mount 24 is preferably attached to the guide arm 20 at a connection of two of the intermediate links 42, 44 of the first guide arm 20. The second end 56 of the tool mount 24 is preferably attached to the second guide arm 22 at a connection of two of the intermediate links 42, 44 of the second guide arm 22.

In the preferred embodiment, the movements of the first and second guide arms 20, 22 are synchronized in order to also synchronize the movement of the first and second ends 54, 56 of the tool mount 24. By such synchronization, the tool mount 24 is kept at a constant orientation relative to the moving workpiece 36, regardless of the tool mount's motion. If the tool mount 24 is originally oriented perpendicular to a conveyor 34 and is caused to follow a bow-tie pattern as described above, the tool mount 24 will follow the pattern while continuously maintaining its perpendicular orientation to the conveyor 34. This is a potential advantage if multiple conveyors are to be operated side-by-side, in a limited space. Synchronization of the guide arms 20, 22 also allows multiple lines 74 of moving workpieces 36 to be cut in the same pattern, since multiple cutting nozzles 58 may be attached to the tool mount 24 and each nozzle 58 individually produces the same cutting pattern.

The synchronization of the guide arms 20, 22 may be accomplished by using one of a number of known methods. The preferred method includes one or more coupler links 68, 70, as shown in FIGS. 4 and 5. Coupler links 68, 70 provide the advantage of counterbalancing the motion of the tool mount 24, thereby reducing wear on the components of the apparatus. The coupler links 68, 70 preferably include an adjustment device 72, such as a turnbuckle. Having adjustable coupler links 68, 70 provides an easy method both to orient the tool mount 24 relative to the conveyor 34 and to preload the apparatus to remove any play, or slop, in the pivotable joints.

Additional synchronization methods include a timing belt (not shown) operating between the rotational attachments of the links 40, 46 of the first and second guide arms 20, 22 to the frame 32, or two additional rotation mechanisms 29, 31 (see FIGS. 4 and 5) in communication with the second guide arm 22 in a manner similar to the connections of the rotation mechanisms 28, 30 to the first guide arm 20 (operating either independently or as slaves).

In operation, multiple lines 74 of moving workpieces 36 are carried past the tool mount 24. The rotation mechanisms 28, 30 rotate the links of the first guide arm 20, causing the first end 54 of the tool mount 24 to move. The second end 56 of the tool mount 24 is synchronized to follow the same movements as the first end 54.

The cutting jet nozzles 58 of the tool mount 24 pass over the moving workpieces 36, cutting them in the desired shape. Once the tool mount 24 has reached the end of its crosswise stroke, it may be moved in the opposite crosswise direction to effect another cutting stroke. In this manner, the multiple lines 74 of moving workpieces 36 are cut without having to stop the cutting jet nozzles 58 in order to reposition the nozzle 58 on the other side of the moving workpieces 36.

A wide variety of cutting patterns may be produced using the apparatus.

Using just the bow-tie pattern described above, a grid pattern may easily be cut in a moving workpiece 36 by locating the nozzles 58 close enough together that the translation of the tool mount 24 upstream continues to cut the object. The nozzles 58 should be spaced at exactly the distance apart as the distance of the crosswise cut as formed on the moving workpiece 36. Therefore, the cuts made by each of the nozzles 58 intersect to form individual squares and an overall grid pattern.

The present invention may also be configured to provide a double guide arm cutting apparatus without synchronization between the first and second guide arms.

Figure 6:
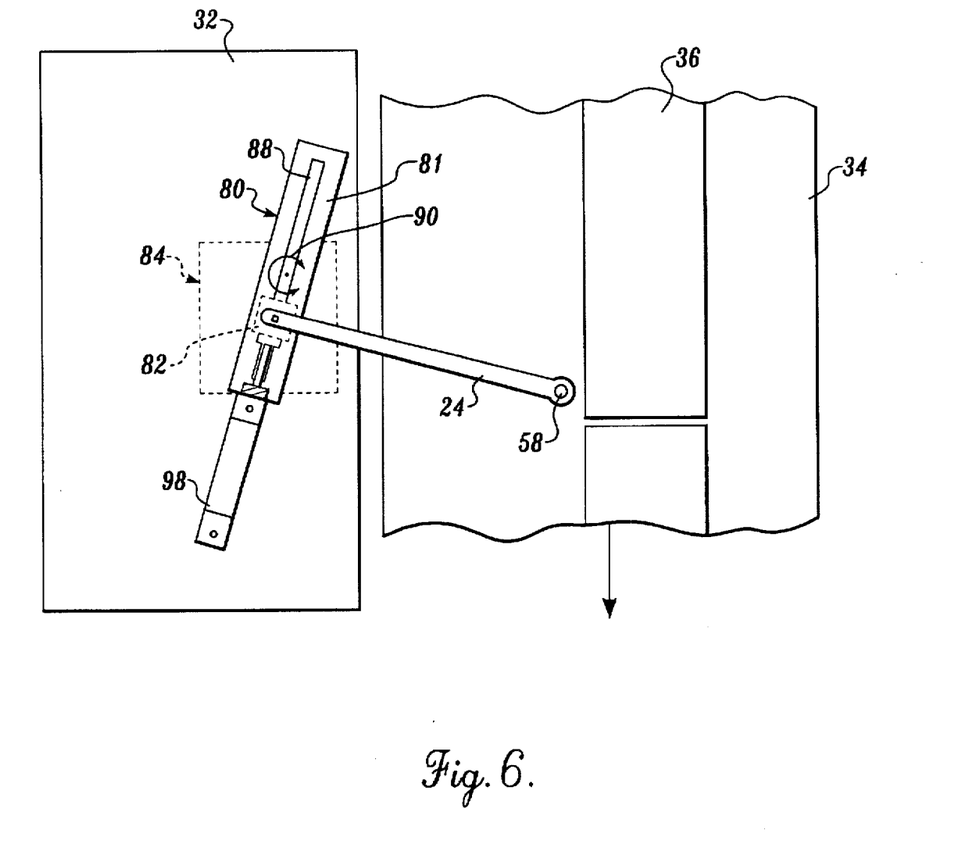
FIG. 6 is a plan view schematic of a single pivot frame cutting apparatus constructed in accordance with the present invention.

The second guide arm 22 is then independent from the motions of the first guide arm 20. Two additional rotational mechanisms (not shown) are attached to the second guide arm 22 to form an apparatus capable of producing complicated cutting patterns on the moving workpiece 36. FIG. 6 is a plan view schematic of a single pivot frame cutting apparatus constructed in accordance with the present invention. The apparatus includes a pivot frame 80, a carriage 82, a tool mount 24, a rotation mechanism, and a translation mechanism. As shown in FIG. 6, the apparatus is generally mounted on a stable frame 32 positioned beside a conveyor 34 that is carrying moving workpieces 36.

The pivot frame 80 has an elongated body 81 with a longitudinal guideway 88 extending along the body 81 and an axis of rotation 90 generally perpendicular to the body 81. The axis of rotation 90 preferably intersects the longitudinal guideway 88.

Figure 7:
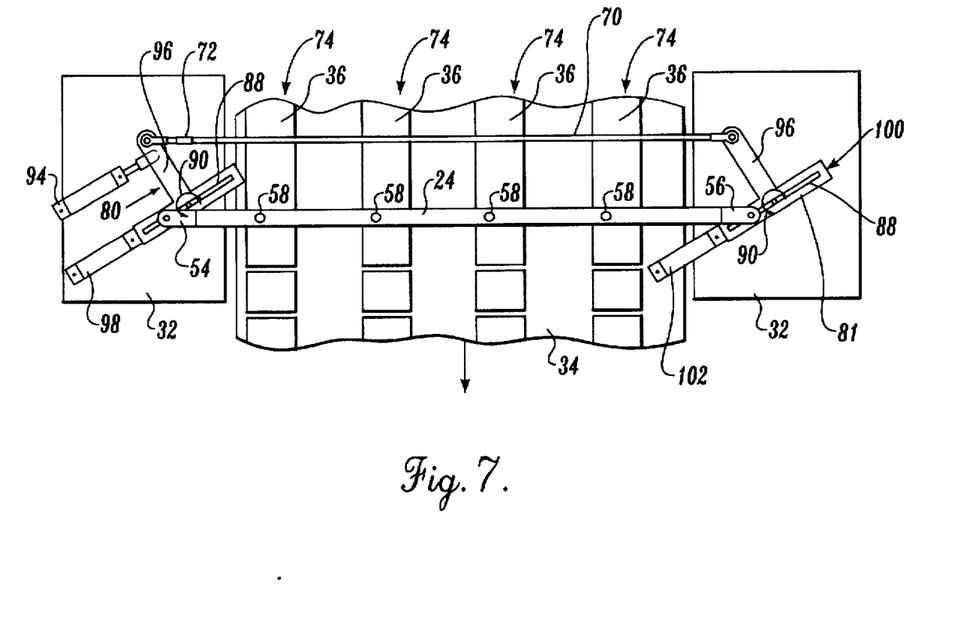
FIG. 7 is a plan view schematic of a double pivot frame cutting apparatus constructed in accordance with the present invention.

The attachment to the frame 32 is preferably by a shaft (similar to item 50) located at the rotational axis 90 of the pivot frame 80. The longitudinal guideway 88 may be one of various types known to those skilled in the art, e.g., a slot, a rail, a roller chain, etc. A slot is shown in FIGS. 6 and 7. The carriage 82 is engagable to the slot and is capable of translating along the pivot frame body 81 in the slot.

The tool mount 24 of the pivot frame embodiment is the same tool mount as defined for the guide arm embodiment. The tool mount 24 is fixedly attached to the carriage 82 at an angle to be determined by the particular application. The tool mount 24 may be adapted to support one or more water jet nozzles 58, or other operating tools.

The rotation mechanism is in communication with the pivot frame 80 to cause the pivot frame 80 to rotate about its axis 90. The rotation mechanism may be any known method. The pivot frame 80 of FIG. 6 is rotated using a motor 84, similar to the motor rotation mechanism shown in FIG. 5. The pivot frame 80 of FIG. 7 is rotated using a linear actuator 94. The pivot frame 80 in FIG. 7 includes an arm 96 extending transversely from the pivot frame body 8 1, with the free end of the arm 96 connected to the actuator 94. Extension and retraction of the actuator 94 causes both the arm 96 and pivot frame 80 to rotate about the pivot frame's axis 90. Any positioning technology, however, may be used, e.g., stepper motor, pneumatic actuator, hydraulic actuator, etc.

The translation mechanism is attached between the carriage 82 and the pivot frame 80 to cause the carriage 82 to translate along the longitudinal guideway 88 of the pivot frame 80. Movement of the carriage 82 causes like movement of the tool mount 24. The translation mechanism may be any known method; the pivot frame 80 of FIG. 6 uses a translation mechanism linear actuator 98.

In operation, the rotation mechanism rotates the pivot frame 80, while the translation mechanism translates the carriage 82. The tool mount 24 follows the motions of the pivot frame 80 and carriage 82, defining a cutting path through the moving workpiece 36. In order to produce a crosswise cut as discussed in the Background, the pivot frame 80 is rotated in one direction. The carriage 82 is located along the longitudinal guideway 88 at its most upstream end. The carriage 82 is then translated along the guideway 88 at a constant velocity to form a crosswise cut in the moving workpiece 36. Once the carriage 82 reaches the end of its downstream translation, the pivot frame 80 is rotated in the opposite direction, and the carriage 82 is translated back to its original upstream position. The carriage 82 is again translated in a cutting direction (i.e., a motion having a component of downstream travel). Once at the end of its stroke, the pivot frame 80 is rotated back to its original position, and the carriage 82 is returned to its upstream position. The cycle is repeated. Because the apparatus must reposition the carriage 82 before another crosswise cut stroke is made, this embodiment of the present invention is most useful when extremely high speed and/or accuracy are not required. To produce more complex cuts, the pivot frame 80 may rotate simultaneously with the translation of the carriage 82. Alternatively, the carriage 82 may be made to translate at a non-constant velocity.

Figure 8:
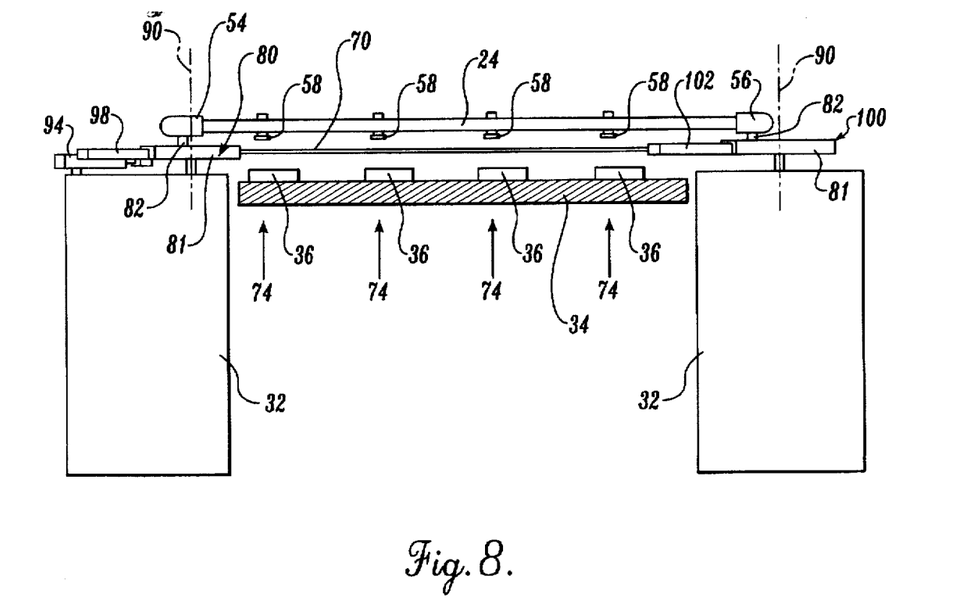
FIG. 8 is a side view schematic of the double pivot frame cutting apparatus of FIG. 7.

A second pivot frame 100 may be added to operate in conjunction with a first pivot frame 80, as shown in the schematic views of FIGS. 7 and 8. The second pivot frame 100 is positioned opposite the first pivot frame 80, on the other side of the conveyor 34. An elongated tool mount 24 with first and second ends 54, 56 may be used to support multiple cutting nozzles 58, as shown in FIGS. 7 and 8. The tool mount 24 is preferably connected to each carriage 82 of the pivot frames 80, 100 using rod-end-bearings. Likewise, a single cutting nozzle 58 may be used if only one line 74 of moving workpieces 36 is passing by the apparatus (as shown in FIG. 6). The first end 54 of the tool mount 24 is rotatably attached to the carriage 82 of the first pivot frame 80, and the second end 56 of the tool mount 24 is rotatably attached to the carriage 82 of the second pivot frame 100.

In the preferred embodiment, the movements of the first and second pivot frames 80, 100 are synchronized in order to also synchronize the movement of the first and second ends 54, 56 of the tool mount 24. Synchronization permits the tool mount 24 to be kept at a constant orientation to the moving workpieces 36 regardless of the tool mount's motion. Synchronization of the pivot frames 80, 100 may be accomplished by using one of a number of known methods, as discussed above for the rotation of the guide arms 20, 22. The translating motion of the carriages 82 is fairly well synchronized already by the tool mount 24 located between the carriages. If additional translating synchronization is desired, an independent translation mechanism (such as a second linear actuator 102, as shown in FIGS. 7 and 8) may be attached to the carriage 82 of the second pivot frame 100 to translate the carriage 82 in unison with the translation of the carriage 82 of the first pivot frame 100.

In operation, multiple lines 74 of moving workpieces 36 are carried past the tool mount 24. The rotation mechanism 84 rotates the first pivot frame 80, directly causing the first end 54 of the tool mount 24 to move. The translation mechanism 86 translates the carriage 82 along the longitudinal guideway 88 of the first pivot frame 80, causing the first end 54 of the tool mount 24 to translate. The second end 56 of the tool mount 24 is synchronized to follow the same movements as the first end 54 of the tool mount 24. The cutting nozzles 58 of the tool mount 24 pass over the moving workpieces 36, cutting them in the desired shape. Once the tool mount 24 has reached the end of its crosswise stroke, it may be moved in the opposite crosswise direction to effect another cutting stroke. In this manner, the multiple lines 74 of moving workpieces 36 are cut without having to stop the cutting nozzles 58 in order to reposition the nozzles 58 on the other side of the moving workpieces 36.

To produce a crosswise cut as discussed in the Background, the first and second pivot frames 80, 100 are rotated in one direction, such that the later translation of each carriage 82 will follow an diagonal path over the conveyor 34 that compensates for the conveyor's velocity. Each carriage 82 is located along its respective longitudinal guideway 88 at an upstream position. Next, the carriages 82 are translated along the guideway 88 of the pivot frames 80, 100 at a constant velocity, to form crosswise cuts in the moving workpieces 36. Once the carriages 82 reach the end of their downstream translation, the pivot frames 80, 100 rotate oppositely, and the carriages 82 are translated back to their original upstream positions. The carriages 82 are then retranslated in their cutting direction (that is, a motion having a component of downstream travel). Once at the end of their stroke, the pivot frames 80, 100 are rotated back to their original location, and the carriages 82 are once again returned to their upstream locations. The cycle is repeated. Because the apparatus repositions the carriages 82 before another crosswise cut stroke is made, this embodiment of the present invention is most useful when extremely high speed and/or accuracy are not required. More complex cuts may be made as described above.

While preferred embodiments of the invention have been illustrated and described, it will be appreciated that various changes can be made therein without departing from the spirit and scope of the invention. In particular, it should be understood that the present invention is adaptable to provide various type of work in a number of different applications and is not limited to being a water jet cutter for food on a conveyor 34. Such variations include routers, mill cutters, lasers, blade cutters, welders, paint sprayers, pickup mechanisms, glue guns, and even the application of ingredients (such as icing to cakes). Therefore, the above references to nozzles and cutting are to be construed broadly to encompass more than water jet nozzles and cutting work. Rather, the present invention is adaptable for use in a wide variety of instances.

The embodiments of the invention in which an exclusive property or privilege is claimed are defined as follows:

1. An apparatus for doing work to a material moving along a path relative to the apparatus, comprising:
   (a) first and second guide arms, each guide arm including a first link, a last link, and at least two intermediate links disposed between the first and last links;
   the first, last, and intermediate links of the first and second guide arms pivotably connected substantially end-to-end to each other to define a multiple bar linkage arrangement;
   (b) a tool mount having a first end connected to an intermediate link of the first guide arm, and a second end connected to an intermediate link of the second guide arm;
   (c) first and second rotation mechanisms,
   the first rotation mechanism in communication with the first guide arm at a location on the first link, the first rotation mechanism for pivoting the first link about an axis of rotation generally parallel to the axes of rotation of the rotatable connections of the first, intermediate, and last links of the first guide arm;
   the second rotation mechanism in communication with the first guide arm at a location on the last link, the second rotation mechanism for pivoting the last link about an axis of rotation generally parallel to the axes of rotation of the rotatable connections of the first, intermediate, and last links of the first guide arm;
   whereby rotation of the first and last links of the first guide arm causes movement of the intermediate links of the first guide arm, further causing movement of the tool mount in the path of the moving material; and
   (d) synchronization means connected between the first and second guide arms;
   whereby rotation of the first and second rotation mechanisms at the first guide arm causes synchronous motion of the second guide arm.

2. An apparatus according to claim 1, wherein the tool mount includes at least one cutting nozzle.

3. An apparatus according to claim 1, wherein the tool mount includes at least one pickup mechanism.

4. An apparatus according to claim 1, wherein the tool mount is pivotably attached at the one end to the rotatable connection of two of the intermediate links of the first guide arm, and at the second end to the rotatable connection of two of the intermediate links of the second guide arm.

5. An apparatus according to claim 1, wherein the synchronization means synchronizes the rotation of at least one of the first and last links of the first guide arm with one of the corresponding first and last links of the second guide arm.

6. An apparatus according to claim 5, wherein the synchronization means includes a coupler link attached between at least one of the (a) first links of the first and second guide arms at locations spaced from the ends of the first links, pivotally connected to corresponding intermediate links, and (b) the last links of the first and second guide arms at locations spaced from the ends of the last links pivotally connected to intermediate links.

7. An apparatus according to claim 2, wherein the synchronization means comprises third and fourth rotation mechanisms;
   the third rotation mechanism being in communication with the second guide arm at a location on the first link for pivoting its first link about an axis of rotation generally parallel to the axes of rotation of the rotatable connections of the first, intermediate, and last links of the second guide arm; and
   the fourth rotation mechanism in communication with the second guide arm at a location on the last link for pivoting its last link about an axis of rotation generally parallel to the axes of rotation of the rotatable connections of the first, intermediate, and last links of the second guide arm;
   whereby rotation of the first and last links of the second guide arm causes movement of the intermediate links of the second guide arm, further causing movement of the tool mount in the path of the moving material.

8. An apparatus according to claim 2, wherein each rotation mechanism includes a motor.

9. An apparatus according to claim 1:
   wherein the first rotation mechanism is connected to the first guide arm first link at a location apart from its connection to one of the intermediate links; and
   wherein the second rotation mechanism is connected to the first guide arm last link at a location apart from its connection to one of the intermediate links.

10. An apparatus according to claim 7:
    wherein the third rotation mechanism is connected to the second guide arm first link at a location apart from its connection to one of the intermediate links; and
    wherein the fourth rotation mechanism is connected to the second guide arm last link at a location apart from its connection to one of the intermediate links.

11. An apparatus for doing work to a material moving gong a path relative to the apparatus the apparatus, comprising:
    (a) first and second guide arms, each guide arm including a number of links connected substantially end-to-end to define a multiple bar linkage arrangement; the number of links including at least a first link, a last link, and at least one intermediate link;
    (b) a tool mount having a first end connected to the first guide arm, and a second end connected to the second guide arm;
    (c) first and second rotation mechanisms, the first rotation mechanism being attached to the first guide arm first link and the second rotation mechanism being directly attached to the first guide arm last link;
    (d) whereby rotation of the first and last links of the first guide arm causes movement of the tool mount in the path of the moving material; and
    (e) synchronization means connected between the first and second guide arms; whereby rotation of the first and second rotation mechanisms at the first guide arm causes synchronous motion of the second guide arm;
    wherein the synchronization means includes third and fourth rotation mechanisms connected to the second guide arm first and last links, respectively.

12. An apparatus according to claim 11, wherein the third and fourth rotation mechanisms are capable of independent operation relative to the first and second rotation mechanisms.

13. An apparatus according to claim 11, wherein the third and fourth rotation mechanisms are slaved to the first and second rotation mechanisms.

14. An apparatus for doing work to a material moving along a conveyor, the apparatus comprising:

(a) first and second guide arms, each comprising a first link, a last link, and at least two intermediate links rotatably connected end-to-end to define a multiple bar linkage arrangement;

(b) a tool mount having a first end portion connected to the first guide arm at one of the end-to-end rotatable connections between two of the at least two intermediate links of the first guide arm; the tool mount further having a second end portion connected to the second guide arm at one of the end-to-end rotatable connections between two of the at least two intermediate links of the second guide arm;

(c) first and second rotation mechanisms, the first and second rotation mechanisms each being attached to at least one of the first and last links of at least one of the first and second guide arms;

(d) whereby rotation of the first and second rotation mechanisms causes movement of the guide arms and movement of the tool mount in the path of the moving material;

(e) means for synchronizing movement of the first and second guide arms; the synchronization means comprising at least one coupler link pivotably connected between corresponding links of the first and second guide arms; and (f) whereby rotation of the first and second rotation mechanisms causes synchronous motion between the first and second guide arms.

* * * * *

UNITED STATES PATENT AND TRADEMARK OFFICE
CERTIFICATE OF CORRECTION

| | |
|---|---|
| PATENT NO. : | 5,746,566 |
| DATED : | May 5, 1998 |
| INVENTOR(S) : | C.E. Pfarr et al. |

It is certified that error appears in the above-identified patent and that said Letters Patent is hereby corrected as shown below:

| COLUMN | LINE | |
|---|---|---|
| 10 (Claim 7, | 6 line 1) | "claim 2" should read --claim 1-- |
| 10 (Claim 8, | 25 line 1) | "claim 2" should read --claim 1-- |
| 10 (Claim 11, | 43 line 2) | "gong" should read --along-- |
| 10 (Claim 11, | 43 line 2) | "apparatus the apparatus," should read --apparatus, the apparatus-- |

Signed and Sealed this

Eighteenth Day of August, 1998

Attest:

BRUCE LEHMAN

*Attesting Officer*     *Commissioner of Patents and Trademarks*